Sept. 2, 1952 B. C. HILL ET AL 2,609,509
ELECTRICAL TESTING APPARATUS
Filed June 13, 1945
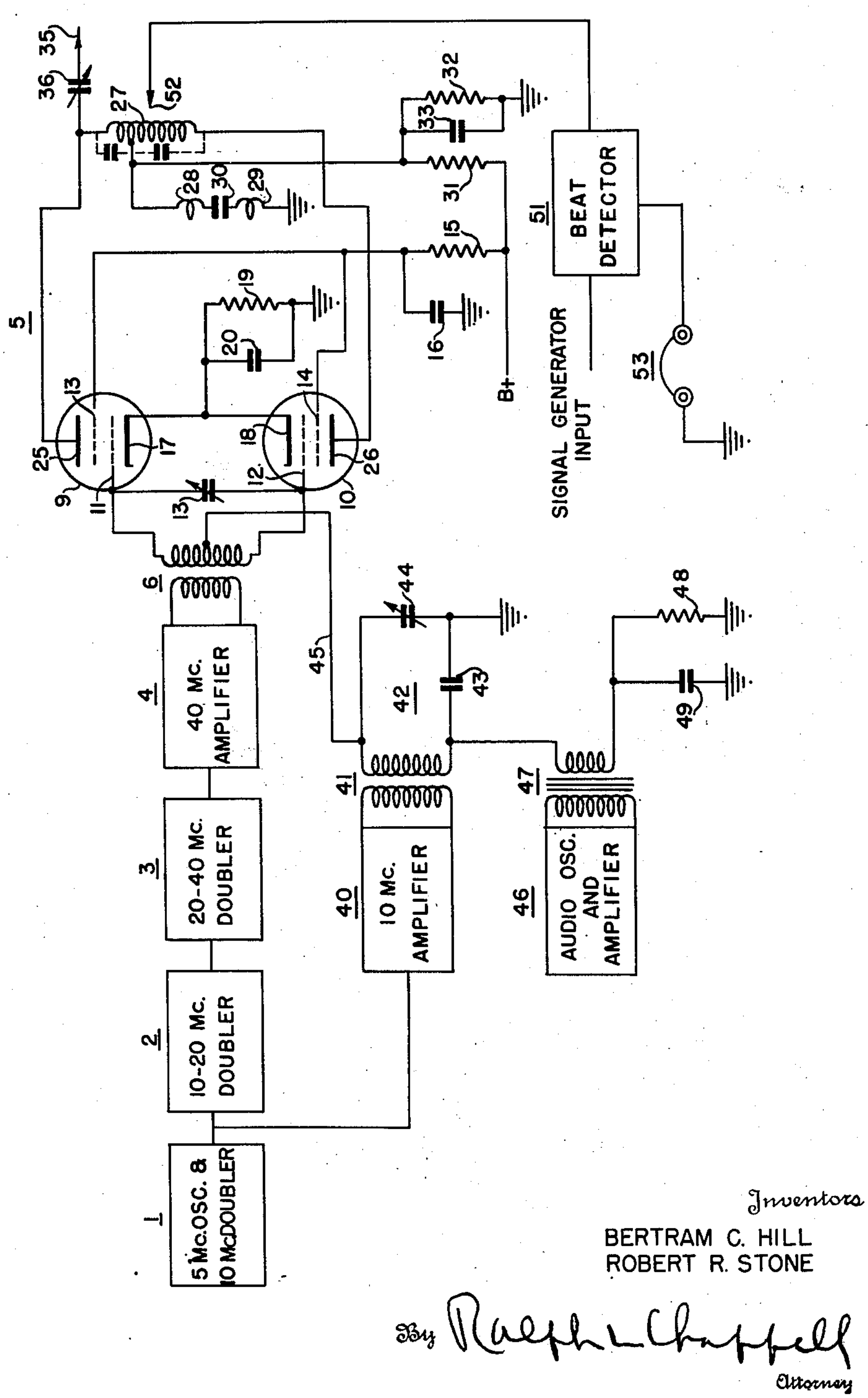
Inventors
BERTRAM C. HILL
ROBERT R. STONE
By Ralph L. Chappell
Attorney Patented Sept. 2, 1952 2,609,509

UNITED STATES PATENT OFFICE 2,609,509

ELECTRICAL TESTING APPARATUS

Bertram C. Hill, Washington, D. C., and Robert R. Stone, United States Navy

Application June 13, 1945, Serial No. 599,290
9 Claims. (Cl. 250—36)

(Granted under the act of March 3, 1883, as amended April 30, 1928; 370 O. G. 757)

The invention relates to electrical testing apparatus, and more particularly to a frequency measuring apparatus incorporating a harmonic generator whereby wavemeters and signal generators operating at high frequencies may be calibrated.

An object of this invention is to provide an efficient and effective electrical testing apparatus incorporating a harmonic generator which will produce a wide band of harmonics together with means for modulating the harmonic output with either audio frequency or radio frequency signals, or both.

In accordance with one embodiment of this invention, an electrical testing apparatus may be provided comprising a high frequency generator, the output of which is amplified and applied to an unbalanced push pull amplifier, the latter being substantially overdriven and having an unbalanced load circuit to provide strong harmonic output. Means are also provided for audio or radio frequency modulation, or both, of the harmonic output. A beat detector is included to permit calibrating signal generators.

Other objects and advantages of the present invention will be apparent from the following detailed description taken in conjunction with the single figure wherein is schematically shown an electrical testing apparatus constructed in accordance with one embodiment of this invention.

Referring now to the drawing, it will be seen that this apparatus includes a high frequency generator 1, providing, for example, an output of ten megacycles. Such a generator may comprise a crystal controlled, electron coupled oscillator operating at five megacycles and doubling to ten megacycles in the plate circuit. The output of this generator is passed through two doubler stages 2 and 3, respectively, being doubled to twenty megacycles in stage 2, and to forty megacycles in stage 3. It will be understood, however, that the electron coupled oscillator may operate at higher or lower frequencies than that mentioned and that more, or fewer, doubling stages may be employed in a particular case, in accordance with the frequency requirements of the apparatus.

In order to produce a signal rich in harmonics, the output of the doubler stage 3 is amplified in a power amplifier 4 and coupled to a harmonic amplifier 5 through a radio frequency transformer 6. The harmonic amplifier 5 comprises a pair of high frequency power amplifier tubes 9 and 10 connected in push pull. The two ends of the secondary of the radio frequency transformer 6 are, respectively, connected to control grids 11 and 12 of the tubes 9 and 10 while the screen grids 13 and 14 of these tubes are connected together and through a resistance 15 to a suitable voltage supply whereby the screen grids may be operated at or above the rated screen voltage, the resistance 15 being by-passed to ground by a condenser 16. The cathodes 17 and 18 of the tubes 9 and 10, respectively, are connected together, and operating bias is obtained on the cathodes by a cathode resistor 19 which is connected to ground and is by-passed by a condenser 20.

Plates 25 and 26, respectively, of tubes 9 and 10 are connected to opposite ends of an unbalanced load circuit comprising an inductance 27 provided with a series resonant by-pass circuit which is connected to ground. The by-pass circuit includes inductances 28 and 29 and a condenser 30 and is connected nearer one end of the inductance 27 than the other to cause one side of the inductance, in this case the side connected to the plate 26 of tube 10 to be resonant at the fundamental frequency applied in push pull to the tubes 9 and 10, while the other side of the inductance 27 is resonant at the second harmonic thereof. In practice, at the high frequencies at which this amplifier is intended to operate, the inductances 28 and 29 actually may comprise the leads associated with the condenser 30. The series resonant by-pass circuit is selected to be resonant at the fundamental frequency to provide a low resistance path to ground for the fundamental frequency output of the harmonic amplifier and thereby to effectively ground the inductance 27 at the point of connection.

The plate voltage supply may be tapped on to the inductance 27 at the same point as the by-pass circuit just described, and is adjusted to provide a plate voltage considerably below (one fifth, for example) the rated voltage on each plate by means of a voltage dividing circuit associated therewith and comprising a resistor 31 and a resistor 32, the resistor 31 being connected in series with the B voltage supply, and having its low voltage end connected to the resistor 32. The resistor 32 is connected to ground and is by-passed by a condenser 33, the capacitance of which is so selected that the time constant of the voltage dividing circuit will be sufficient to prevent the plate voltage from varying with the radio frequency signal applied to the control grid.

In the operation of this apparatus, the control grids 11 and 12 are greatly overdriven and the screen grids 13 and 14 operated at a much higher voltage with respect to their associated plates 25 and 26, respectively, than is the customary practice. In a typical case, employing a power amplifier tube such as that commercially designated as type 829, it has been found that by maintaining a voltage ratio between the control grid, the screen grid, and the plate in each tube on the order of 6 to 3 to 1 strong harmonic output is obtained. For example, the control grids may be driven by a 600 volt signal while screen grids are operated at approximately 300 volts, and the plates at approximately 100 volts. Maintaining such a ratio, it has been found that the harmonics are strong enough to operate wave meters, or to produce beats with signal generators at frequencies as high as the thirtieth harmonic. It will be understood of course that the ratios given are merely illustrative and the optimum ratio in a particular case may vary substantially therefrom.

The output of the harmonic amplifier is applied to an output stub 35 through a coupling condenser 36, connected to the low frequency end of the coil 27, that is the end thereof resonant at the fundamental frequency of the harmonic generator. The stub 35 may be connected directly to the apparatus being calibrated, or may be employed as a radiating element and the radiation therefrom picked up by a suitable antenna associated with the apparatus being calibrated.

In order to provide intermediate check points between the harmonic signals, which in the case shown in the drawing will be forty megacycle harmonics, the harmonic output of the apparatus may be modulated by a second signal of a suitable lower frequency, preferably a sub-multiple of the fundamental frequency of the harmonic amplifier. For example, in the embodiment illustrated, a ten megacycle signal is used to provide this modulation. As hereinbefore stated, the high frequency generator 1 may be selected to provide a ten megacycle output signal and this signal may then be employed, in accordance with this invention, to provide a ten megacycle modulating signal by coupling the output of the generator 1 to a ten megacycle amplifier 40. The output of the ten megacycle amplifier is coupled through a radio frequency transformer 41 to a parallel resonant circuit 42, including the secondary of the transformer 41, a condenser 43 and a variable condenser 44, in series therewith. Ground connection is made between the two condensers. A lead 45, connected to the transformer 41 is center tapped on the radio frequency transformer 6 of the harmonic amplifier circuit, thus applying the amplified ten megacycle signal to the input of the harmonic amplifier. It will be understood of course that other frequencies may be employed as the modulating signals, as may be required.

Some wavemeters are not sufficiently sensitive to operate unless the signal from the harmonic amplifier is audio modulated. In accordance with this requirement, provision is made herein for audio modulation of the harmonic output of the harmonic amplifier by applying an audio signal derived from an audio oscillator and amplifier 46 to the input of the harmonic amplifier. The output of the audio oscillator and amplifier is coupled to the secondary of the amplifier transformer 41 through a coupling transformer 47, one end of the secondary of the coupling transformer 47 being grounded through a resistor 48 by-passed by condenser 49. At audio frequencies, the secondary of the ten megacycle transformer 41 is, in effect, a conductor and offers substantially no impedance to the passage therethrough of the audio frequency signal. It will be apparent from the foregoing that the output of the audio oscillator and amplifier may be applied to the harmonic amplifier alone or, by operating the ten megacycle amplifier 40, in combination with the output of the ten megacycle amplifier so that either ten megacycle modulation or audio modulation, or both may be obtained.

In order to check the calibration of signal generators with the present apparatus, a beat detector circuit 51 is provided, having a probe 52 which is located adjacent the output coil of the harmonic amplifier. The signal picked up by the probe 52 is mixed with the signal from the signal generator being tested and which is connected to the beat detector circuit. Thus when the signal generator is within audio beat note range of a harmonic, the beat note will be amplified in the beat detector circuit and applied to headphones 53.

For initial calibration of both wave meters and signal generators, as distinguished from the calibration of wave meters and signal generators which have previously been roughly calibrated, some single frequency must be present to establish the calibration, as it is not feasible with the present apparatus to determine which 40 megacycle or which 10 megacycle harmonic the instrument under calibration is operating on. A high Q tuned circuit, which will accentuate one frequency and attenuate all others may be used therefor in connection with the calibration of wave meters. With a completely uncalibrated signal generator, it is desirable that the calibration be roughly established at two or more points with a heterodyne frequency meter or a previously calibrated wave meter.

While but one embodiment of this invention has been shown and described, it will be understood that many changes and modifications may be made therein without departing from the spirit or scope of the present invention.

The invention described herein may be manufactured and used by or for the Government of the United States of America for governmental purposes without the payment of any royalties thereon or therefor.

What is claimed is:

1. In an electric testing apparatus, a source of high frequency energy, a harmonic amplifier circuit energized by said high frequency energy for producing an output rich in harmonics of said high frequency, said amplifier including a pair of amplifier tubes connected in push-pull relation and an unbalanced load in the plate circuit of said tubes, and output circuit means operatively associated with said load.

2. In an electrical testing apparatus for generating a wide band of harmonics, a source of high frequency energy, a push-pull harmonic amplifier energized by said energy source, an unbalanced load energized by said harmonic amplifier, and output circuit means operatively associated with said load.

3. A harmonic amplifier comprising a pair of tubes connected in push-pull, each of said tubes having at least a cathode, a grid, a screen grid, and a plate, means applying an operating bias to said cathodes, means applying a potential below the rated operating plate potential of said tube to said plates, means applying a potential to said screen grids higher than the potential applied to said plates, and an unbalanced load in the plate circuit of said tubes.

4. A harmonic amplifier comprising a pair of tubes connected in push-pull, each of said tubes having at least a cathode, a grid, a screen grid, and a plate, means applying an operating bias to said cathodes, means applying a positive potential to said plates, means applying a potential to said screen grids greater than the potential applied to said plates, means applying a potential to said control grids greater than the potential applied to said screen grids, and an unbalanced load in the plate circuit of said tubes.

5. A harmonic amplifier comprising a pair of tubes connected in push-pull, each of said tubes having at least a cathode, a grid, a screen grid, and a plate, means applying an operating bias to said cathodes, means applying a positive potential to said plates, means applying a potential to said screen grids approximately three times the potential applied to said plates, means applying a radio frequency source to said control grids having a peak potential value approximately six times the potential value applied to said plates and an unbalanced load connected in the plate circuit of said tubes, said load including an inductance and means connected to said inductance at an intermediate point thereof such as to cause one end of said inductance to be resonant at the frequency of said radio frequency source.

6. A harmonic amplifier comprising a pair of tubes connected in push-pull, each of said tubes having at least a cathode, a grid, a screen grid, and a plate, means applying an operating bias to said cathodes, means applying a positive potential to said plates, means applying a potential to said screen grids approximately three times the potential applied to said plates, means applying a radio frequency source to said control grids having a peak potential value approximately six times the potential value applied to said plates, and an unbalanced load circuit in the plate circuit of said tubes, said load circuit including an inductance, output circuit means operatively associated with said inductance, and radio frequency by-pass means connected to said inductance at an intermediate point thereof selected to cause a portion of said inductance to be resonant at the frequency of said radio frequency source, said by-pass means including the resonant circuit adjusted to resonate at a frequency of said radio frequency source.

7. An electrical testing apparatus for testing a radio frequency signal generator comprising a source of high frequency energy, a harmonic amplifier energized by said energy source, means to mix the outputs of said amplifier and said signal generator, means associated with the last-named means to indicate the presence of a beat signal, and means facilitating testing of said signal generator including means modulating the output of said amplifier with a radio frequency signal.

8. A harmonic amplifier comprising a pair of tubes connected in push-pull relation, each of said tubes including at least a cathode, a grid, a screen grid and plate, means applying an operating bias to said cathodes, means applying a positive potential to said plates, means applying a potential to said screen grids approximately three times the potential applied to said plates, means applying a potential to said control grids approximately six times the potential applied to said plates and an unbalanced load circuit connected in the plate circuit of said tubes.

9. An electrical testing apparatus for testing a radio frequency signal generator comprising a source of high frequency energy, a harmonic amplifier energized by said energy source, said harmonic amplifier including a pair of tubes connected in push-pull, each of said tubes having at least a cathode, a grid, a screen grid and a plate, means applying an operating bias to said cathodes, means applying a positive potential to said plates, means applying a potential to said screen grids approximately three times the potential applied to said plates, means applying a potential to said control grids approximately six times the potential value applied to said plates, and an unbalanced load connected in the plate circuit of said tubes, said load including an inductance and means connected to said inductance to cause a portion thereof to be resonant at the frequency of said source, means mixing the output of said signal generator with the output of said amplifier, means associated with the output of the last-named means to indicate the presence of a beat signal, and means modulating the output of said amplifier with a radio frequency signal.

BERTRAM C. HILL.
ROBERT R. STONE.

REFERENCES CITED

The following references are of record in the file of this patent:

UNITED STATES PATENTS

| Number | Name | Date |
|---|---|---|
| 1,343,308 | Carson | June 15, 1920 |
| 1,848,507 | Vos et al. | Mar. 8, 1932 |
| 1,982,916 | Kummerer | Dec. 4, 1934 |
| 2,013,806 | Osnos | Sept. 10, 1935 |
| 2,043,242 | Gebhard | June 9, 1936 |
| 2,142,195 | Keall | Jan. 3, 1939 |
| 2,173,496 | Schlesinger | Sept. 19, 1939 |
| 2,186.182 | Stocker et al. | Jan. 9, 1940 |
| 2,218,524 | Chaffee | Oct. 22, 1940 |
| 2,337,328 | Hathaway | Dec. 21, 1943 |
| 2,429,755 | Hallmark | Oct. 28, 1947 |

OTHER REFERENCES

Power-Tube Performance in Class C Amplifiers and Frequency Multipliers as Influenced by Harmonic Voltage, R. I. Sarbacher, Proc. of I. R. E., vol. 31, No. 11, November, 1943.